(12) United States Patent
Yagi et al.

(10) Patent No.: US 7,471,021 B2
(45) Date of Patent: Dec. 30, 2008

(54) WIPER MOTOR FOR DRIVING WIPER

(75) Inventors: Hideyuki Yagi, Toyohashi (JP); Seiichi Murakami, Hamamatsu (JP); Masanori Takeuchi, Nukata-gun (JP); Naohito Kobayashi, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 405 days.

(21) Appl. No.: 11/332,362

(22) Filed: Jan. 17, 2006

(65) Prior Publication Data

US 2006/0163958 A1  Jul. 27, 2006

(30) Foreign Application Priority Data

Jan. 21, 2005 (JP) ............... 2005-014363

(51) Int. Cl.
*H02K 11/00* (2006.01)
*H02K 7/00* (2006.01)

(52) U.S. Cl. .................. 310/71; 310/75 R; 310/239

(58) Field of Classification Search .......... 310/40 MM, 310/68 R, 71, 75 R, 83, 239
See application file for complete search history.

(56) References Cited

U.S. PATENT DOCUMENTS

| | | | | |
|---|---|---|---|---|
| 4,398,135 | A | * | 8/1983 | Busch et al. ............. 318/443 |
| 4,572,979 | A | * | 2/1986 | Haar et al. ............. 310/68 R |
| 5,063,317 | A | * | 11/1991 | Bruhn ................. 310/91 |
| 5,218,255 | A | | 6/1993 | Horiguchi |
| 5,453,649 | A | | 9/1995 | Blanchet |
| 6,410,849 | B1 | | 6/2002 | Okabe et al. |
| 6,481,550 | B2 | | 11/2002 | Yamamoto et al. |
| 6,727,613 | B2 | | 4/2004 | Kawakami et al. |
| 6,787,953 | B2 | * | 9/2004 | Torii .................. 310/71 |
| 6,906,438 | B2 | | 6/2005 | Ursel et al. |
| 2002/0011390 | A1 | | 1/2002 | Yamamoto et al. |
| 2004/0066111 | A1 | | 4/2004 | Torii |

FOREIGN PATENT DOCUMENTS

JP  59-141478  9/1984

(Continued)

OTHER PUBLICATIONS

Search Report from European Patent Office issued on Apr. 25, 2006 for the related European patent application No. 05017644.5-2424.

(Continued)

*Primary Examiner*—Tran Nguyen
(74) *Attorney, Agent, or Firm*—Posz Law Group, PLC (57) ABSTRACT

A connector part extends outward of a yoke housing from a holder base and is connectable with an external connector to receive an electric signal. A contact base extends from the holder base into an interior of the gear housing through a communication hole, which is formed in a yoke housing side end of the gear housing. The contact base supports terminals, which provide an electrical connection between stationary contacts and brushes. An intermittent drive unit is installed to the connector part to intermittently drive an armature through the brushes based on the electric signal received from the external connector.

12 Claims, 8 Drawing Sheets

FOREIGN PATENT DOCUMENTS

| | | | | |
|---|---|---|---|---|
| JP | 61169355 | A | * | 7/1986 |
| JP | 01090849 | A | * | 4/1989 |
| JP | 6-44371 | | | 6/1994 |
| JP | 2000-282747 | | | 10/2000 |
| JP | A-2001-289286 | | | 10/2001 |
| JP | A-2003-299315 | | | 10/2003 |

OTHER PUBLICATIONS

Search Report from European Patent Office issued on Apr. 25, 2006 for the corresponding European patent application No. 06001025.3-2424.

U.S. Appl. No. 11/199,067, filed Aug. 9, 2005, Yagi.

* cited by examiner

WIPER MOTOR FOR DRIVING WIPER

CROSS REFERENCE TO RELATED APPLICATION

This application is based on and incorporates herein by reference Japanese Patent Application No. 2005-14363 filed on Jan. 21, 2005. Furthermore, this application is copending with U.S. patent application Ser. No. 11/199,067 filed on Aug. 9, 2005 for "MOTOR APPARATUS HAVING ROTATIONAL POSITION DETECTOR" and assigned to a common assignee.

BACKGROUND OF THE INVENTION

1. Field of the Invention

The present invention relates to a wiper motor for driving a wiper.

2. Description of Related Art

A wiper motor of one previously proposed wiper system installed in, for example, a vehicle includes an automatic stop switch (an automatic stop mechanism for automatically stopping a wiper at a predetermined position). In this motor, even when a wiper switch is turned off to stop the wiper (the wiper having a wiper arm and a wiper blade), the wiper is not immediately, unconditionally stopped. Rather, upon turning off of the wiper switch, the wiper is moved to the predetermined position and is stopped there.

The automatic stop switch includes a movable plate (a movable contact) and a plurality of stationary contacts (stationary contact points). The movable plate is secured to a wheel gear of a speed reducing mechanism of the wiper motor and has a predetermined electrically conductive pattern. The stationary contacts are slidably engageable with the movable plate (the movable contact). Through connection/disconnection between the movable plate (the movable contact) and the stationary contacts, the power supply to the wiper motor is maintained through the automatic stop switch after the turning off of the wiper switch until the wiper is placed to the predetermined stop position.

Furthermore, one previously proposed wiper motor includes an intermittent drive circuit for intermittently driving the wiper (see Japanese Unexamined Patent Publication No. 2001-289286 corresponding to U.S. Pat. No. 6,410,849 B1). In order to intermittently drive the wiper, cooperation with the automatic stop switch is required. That is, a connection between the intermittent drive circuit and the stationary contacts is required. Thus, in Japanese Unexamined Patent Publication No. 2001-289286, a unit, which includes the intermittent drive circuit, is installed to an outer surface of a gear housing, which receives the wheel gear including the movable plate, to allow easy electrical connection between the intermittent drive circuit and the stationary contacts. In such a wiper motor, the electrical connection between the intermittent drive circuit and the stationary contacts is eased.

However, in the above wiper motor, the electrically conductive lines for connecting between power supply brushes of a motor main body and the automatic stop switch (the stationary contacts) and also the electrically conductive lines for supplying electric power to the brushes are installed as a separate connection unit on the outer surface of the gear housing. Thus, the number of components and the number of assembling steps are disadvantageously increased.

Furthermore, in the above wiper motor, an output shaft, which is supported by the gear housing and protrudes outward, is supported by a vehicle body in such a manner that the output shaft projects outward of the vehicle body through an installation opening formed in the vehicle body. In such a case, water (e.g., rain water droplets or car wash water) may possibly intrude into an interior of the vehicle body along the output shaft, possibly causing intrusion of the water into the gear housing. Thus, in the wiper motor of the above type, in which the unit having the intermittent drive circuit and the connection unit are provided on the outer surface of the gear housing, a separate protective measure is disadvantageously required to implement effective water resistance of the conductive lines.

SUMMARY OF THE INVENTION

The present invention addresses the above disadvantages. Thus, it is an objective of the present invention to provide a wiper motor, which enable a reduction in the number of components and thereby the number of assembling steps and enables an improvement in water resistance of conductive lines with a relatively simple structure.

To achieve the objective of the present invention, there is provided a wiper motor for driving a wiper. The wiper motor includes a yoke housing, an armature, a gear housing, a wheel gear, an output shaft, a brush holder device and an intermittent drive unit. The armature is rotatably received in the yoke housing. The gear housing is connected to the yoke housing. The wheel gear is rotatably received in the gear housing and decelerates rotation of the armature. The wheel gear has a movable plate, which is secured to an end surface of the wheel gear and has an electrically conductive pattern. The output shaft is rotatably supported and is driven by a drive force transmitted from the wheel gear. The output shaft is directly or indirectly connected to the wiper. The brush holder device is installed between the yoke housing and the gear housing. The brush holder device includes a plurality of brushes, a holder base, a connector part, a contact base and a plurality of holder-side conductive lines. The brushes supply electric power to the armature. The holder base has a brush holder, which holds the plurality of brushes. The connector part extends outward of the yoke housing from the holder base and is connectable with an external connector to receive an electric signal from the external connector. The contact base extends from the holder base into an interior of the gear housing through a communication hole, which is formed in a yoke housing side end of the gear housing. The contact base supports a plurality of stationary contacts that are slidably engageable with the electrically conductive pattern of the movable plate. The plurality of stationary contacts is electrically connected and disconnected to the electrically conductive pattern of the movable plate in response to rotation of the wheel gear to stop the wiper at a predetermined position. At least two of the plurality of holder-side conductive lines provide an electrical connection between the plurality of stationary contacts and the plurality of brushes. The intermittent drive unit is installed to the brush holder device. The intermittent drive unit includes an intermittent drive circuit that is electrically connected to the plurality of holder-side conductive lines upon installation of the intermittent drive unit to the brush holder device to intermittently drive the armature through the plurality of brushes based on the electric signal received from the external connector.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
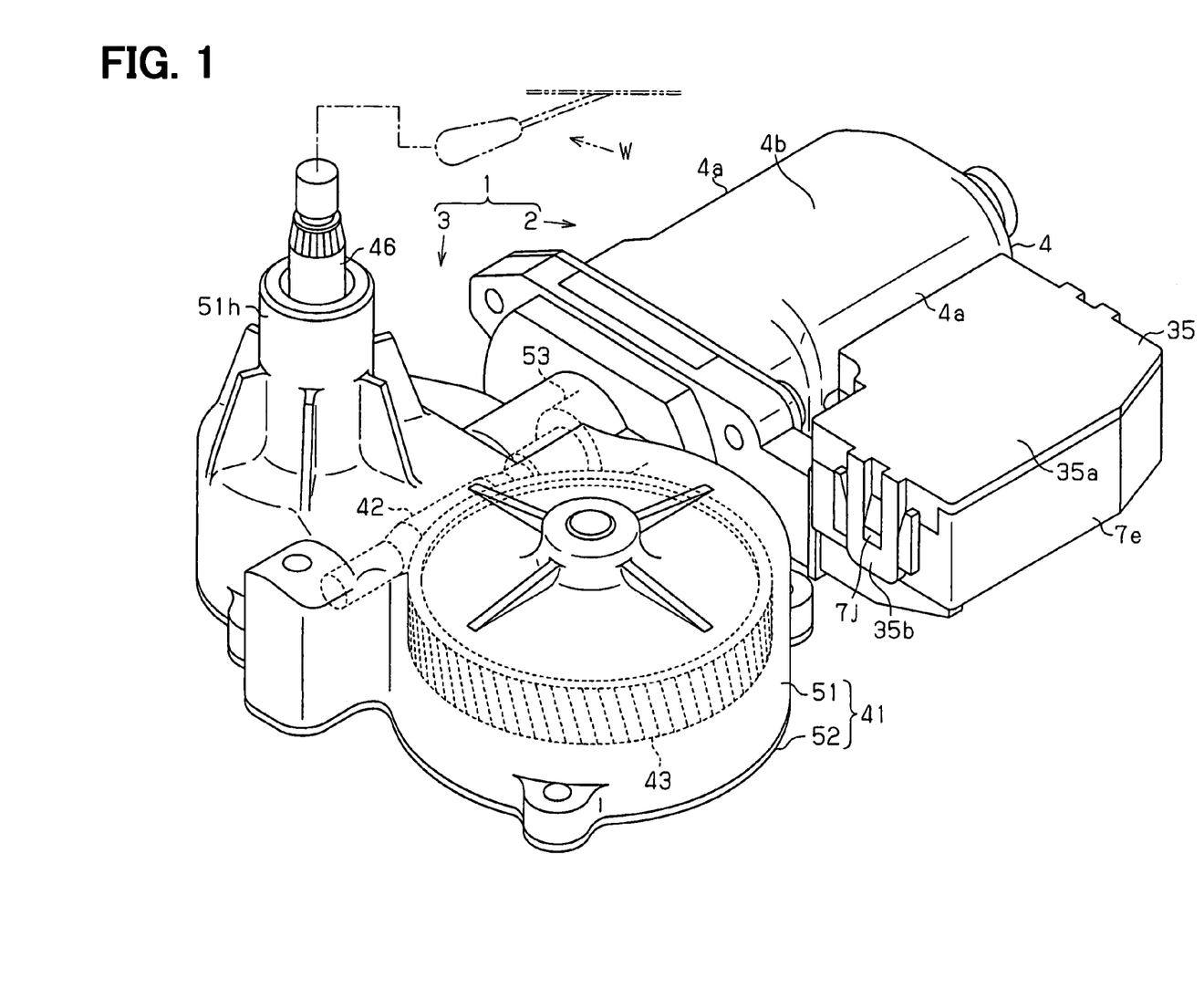
FIG. 1 is a perspective view of a wiper motor according to an embodiment of the present invention.

A wiper motor according to an embodiment of the present invention will be described with reference to FIGS. 1 to 9. In the present embodiment, the wiper motor is implemented as a wiper motor of a rear wiper system of a vehicle. As shown in FIG. 1, the wiper system includes the wiper motor (hereinafter, simply referred to as a motor) 1 and a wiper W. The motor 1 includes a motor main body 2 and a gear section 3.

Figure 2:
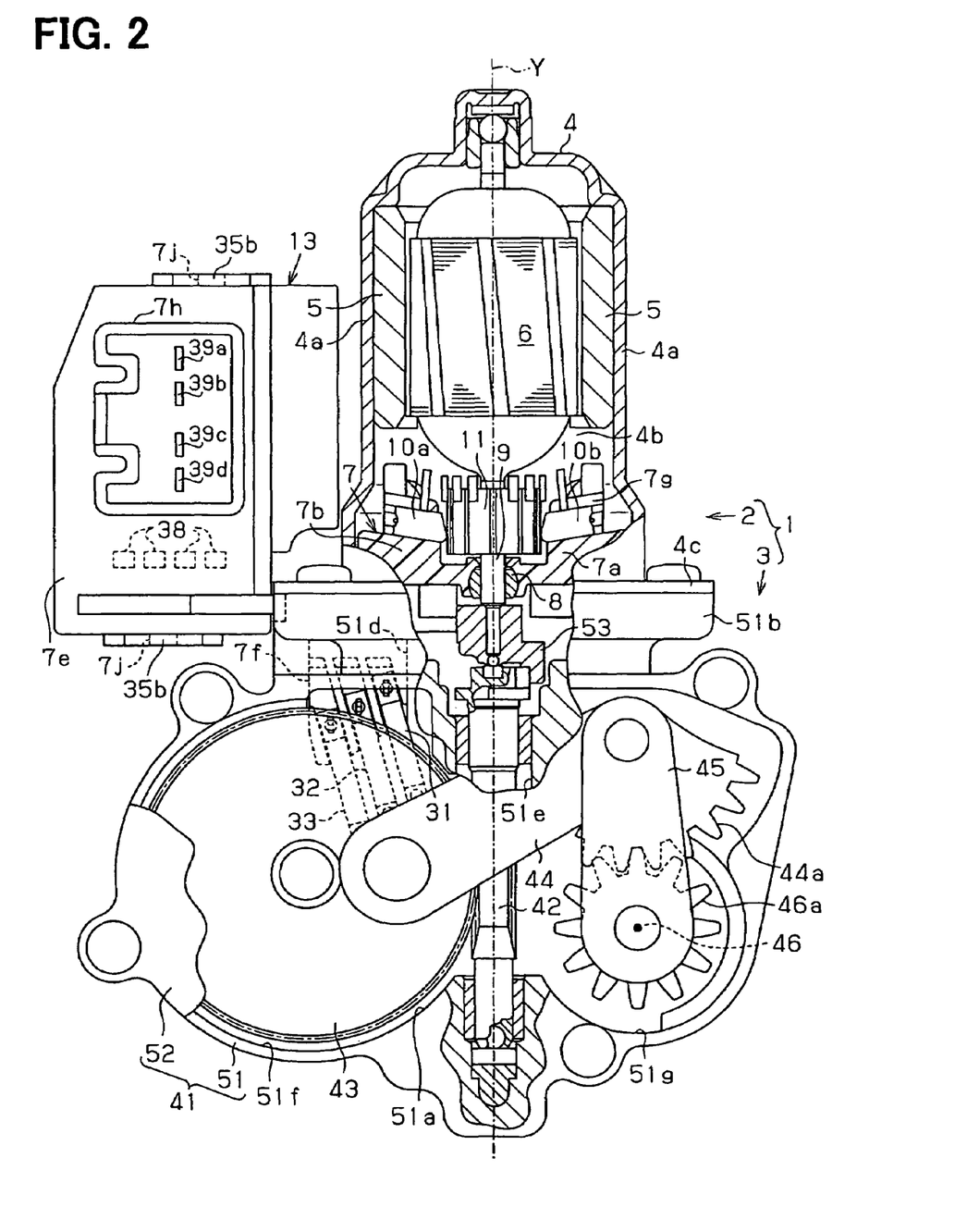
FIG. 2 is a schematic cross sectional view of the motor of the embodiment.

With reference to FIG. 2, the motor main body 2 includes a yoke housing (hereinafter, simply referred to as a yoke) 4, two magnets 5 and an armature 6. The yoke 4 is formed into a cup shape. The magnets 5 are fixed to an inner peripheral surface of the yoke 4. The armature 6 is rotatably supported in the yoke 4. The yoke 4 of the present embodiment includes two arcuate segments 4a (FIGS. 1 and 2) and two planar segments 4b (FIG. 1). The two arcuate segments 4a are opposed to each other in a direction perpendicular to an axis of the armature 6 (a direction perpendicular to a rotational axis Y of the armature 6). The magnets 5 are fixed to the inner surfaces of the arcuate segments 4a, respectively. The planar segments 4b connect the arcuate segments 4a together. The yoke 4 has a generally flat form, which is compressed in the direction perpendicular to the axis of the armature 6 and is therefore relatively thin in an opposing direction (a direction perpendicular to a plane of any one of the planar segments 4b) of the planar segments 4b, in which the planar segments 4b are opposed to each other. A flange 4c is formed at an opening of the yoke 4 and extends outwardly in a radial direction of the yoke 4.

A brush holder device 7 is arranged in the opening of the yoke 4. As shown in FIGS. 2 to 5, the brush holder device 7 includes a brush holder resin part 7a, which is formed as a housing that is molded from a resin material (a dielectric resin material) that provides electric insulation. The brush holder resin part 7a includes a holder base 7b, a flange 7c (FIG. 3), an extension 7d, a connector part 7e and contact base 7f, which are formed integrally. The holder base 7b is made into a plate form, which is received into the opening of the yoke 4, i.e., covers the opening of the yoke 4. A bearing 8 (FIG. 2) is held in a center hole of the holder base 7b, and a distal end side of a rotatable shaft 9 of the armature 6 is rotatably supported by the bearing 8. A brush holder 7g is provided in the holder base 7b at an interior side of the yoke 4. Power supply brushes 10a, 10b are held in the brush holder 7g to supply electric power to the armature 6. The brushes 10a, 10b are urged against a commutator 11, which is secured to the rotatable shaft 9. The flange 7c protrudes outward from the holder base 7b. The extension 7d extends outward from a portion of the flange 7c on a side of one of the arcuate segments 4a, i.e., extends outward from the one of the arcuate segments 4a in the radial direction of the rotatable shaft 9.

The connector part 7e is provided in the distal end of the extension 7d. The connector part 7e of the present embodiment is formed in such a manner that an external connector 12 (FIG. 4) is connectable to the connector part 7e in the opposing direction of the planar segments 4b, i.e., in the direction perpendicular to the plane of any one of the planar segments 4b, specifically in an upward direction in FIG. 4. A generally rectangular tubular connector fitting portion 7h (FIG. 5) is formed in the connector part 7e. The connector fitting portion 7h has an opening, which is opened in the opposing direction of the planar segments 4b, i.e., in the direction perpendicular to the plane of any one of the planar segments 4b, specifically in the upward direction in FIG. 4. The external connector 12 is formed to be connectable (insertable) to the connector fitting portion 7h. In other words, the connector part 7e is provided with the connector fitting portion 7h, which has the opening that is opened in the direction generally parallel to a plane of the holder base 7b. Furthermore, an installing portion 7i is formed in the connector part 7e at the opposite side (the lower side in FIG. 4), which is opposite from the opening direction of the opening of the connector fitting portion 7h. An intermittent drive unit 13, which will be described latter, is installable to the installing portion 7i. The installing portion 7i has two engaging claws 7j, which project outward from longitudinal ends, respectively, of the connector part 7e.

Figure 3:
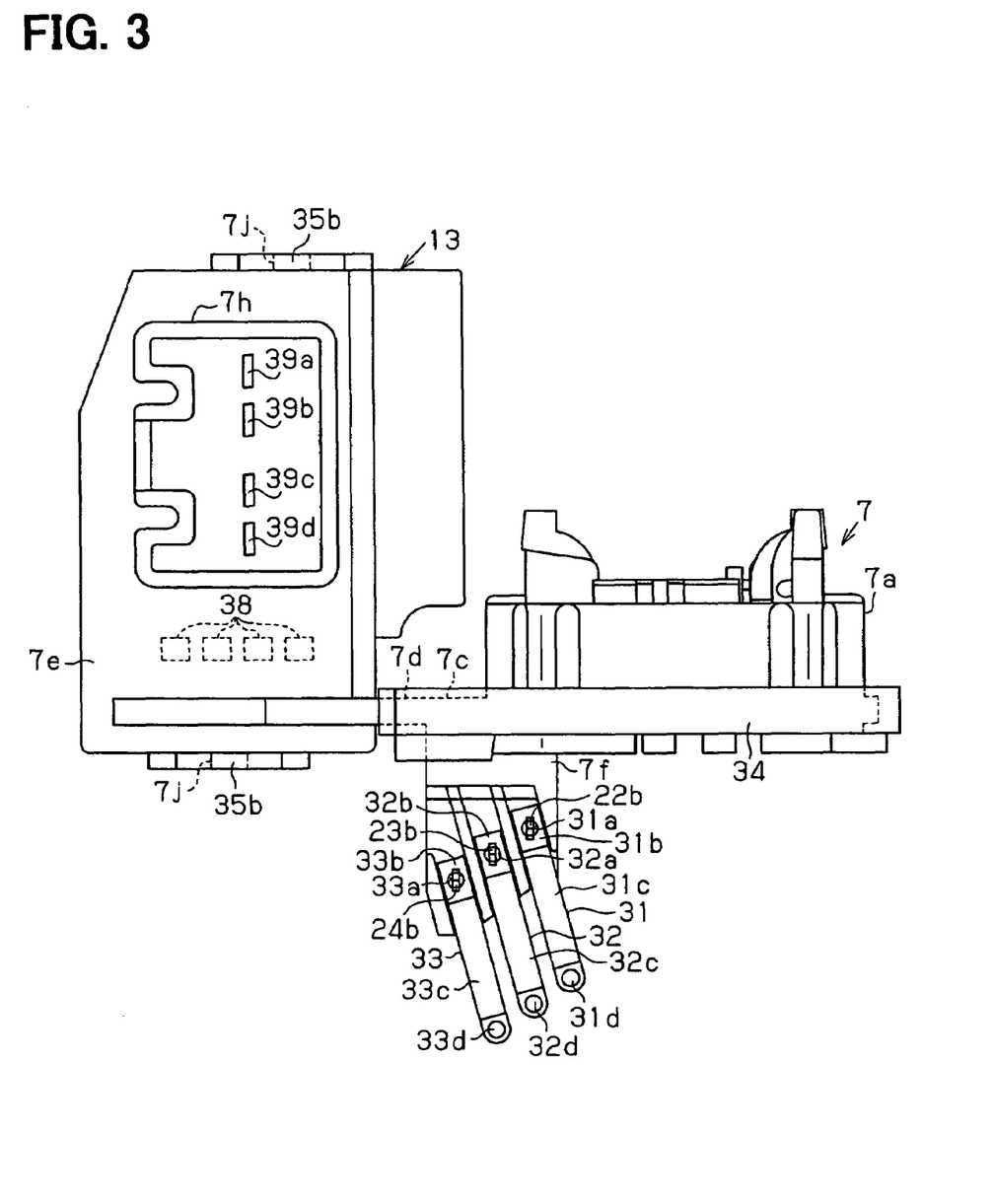
FIG. 3 is a side view of a brush holder according to the embodiment.
Figure 4:
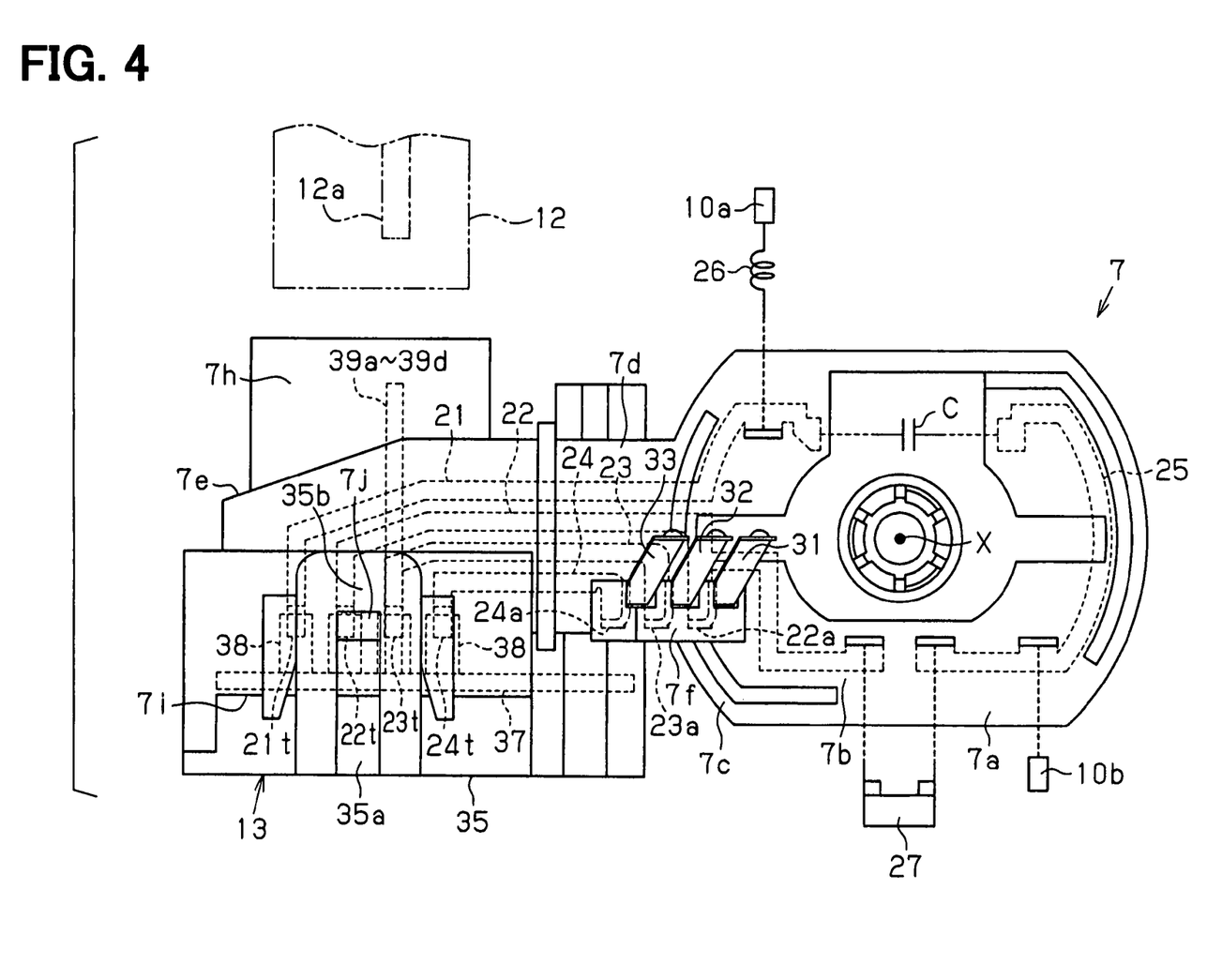
FIG. 4 is a bottom view of the brush holder of the embodiment.

The contact base 7f is formed between the brush holder 7g and the connector part 7e to project rearward from the holder base 7b toward a gear housing 41 (a downward direction in FIG. 2 or 3). As shown in FIG. 4, the contact base 7f is formed into the thin plate form, which is thinned in the direction perpendicular to the plane of any of the planar segments 4b (FIG. 1). The contact base 7f is located on the planar segment 4b side of the rotational axis X of the armature 6, i.e., is located on the side of the rotational axis X of the armature 6 that is closer to the one of the planar segments 4b and is the lower side in FIG. 4.

As shown in FIG. 4, in the brush holder device 7, a plurality of terminals (five terminals in the present embodiment) 21-25, which serve as holder-side conductive lines, is insert-molded in the brush holder resin part 7a in such a manner that a portion of each terminal 21-25 is exposed from the brush holder resin part 7a. Each terminal 21-25 is made as an electrically conductive metal plate (a planar conductive member).

The terminal 21 serves as a first power supply terminal (a high electric potential supply terminal). One end of the terminal 21 is exposed outward from the connector part 7e, and the other end of the terminal 21 extends to the holder base 7b side and is connected to the brush 10a through a choke coil 26 (illustrated in a simplified form in FIG. 4 and more clearly illustrated in FIG. 9), which is installed to the holder base 7b. The other end of the terminal 21 is also connected to a first terminal connection of a capacitor C (illustrated in a simplified form in FIG. 4 and not illustrated in FIG. 9), which is installed to the holder base 7b.

The terminal 22 serves as a second power supply terminal (a low electric potential supply terminal). One end of the terminal 22 is exposed outward from the connector part 7e, and the other end of the terminal 22 extends to the holder base 7b side and is connected to a first terminal connection of a breaker 27 (illustrated in a simplified form in FIG. 4 and more clearly illustrated in FIG. 9), which is installed to the holder base 7b. A contact-side terminal connection 22a is formed between the one end and the other end of the terminal 22 in such a manner that the contact-side terminal connection 22a is branched from the rest of the terminal 22. The contact-side terminal connection 22a extends to the distal end side of the contact base 7f and has a protrusion 22b (FIG. 3) in a distal end of the contact-side terminal connection 22a. The contact-side terminal connection 22a extends in the axial direction of the armature 6. The contact-side terminal connection 22a is configured in such a manner that a plate thickness direction of the contact-side terminal connection 22a generally coincides with the direction perpendicular to the plane of the planar segment 4b (FIG. 1), and the plane of the contact-side terminal connection 22a is generally parallel to the plane of the planar segment 4b. The protrusion 22b is bent to protrude outward (toward the front side of the plane of FIG. 3) from the interior of the contact base 7f. FIG. 3 shows the protrusion 22b, which is secured by split bending that is implemented by respectively bending two pieces of a distal tip of the protrusion 22b in opposite directions.

One end of a first stationary contact side terminal 23 is exposed outward from the connector part 7e, and the other end of the stationary contact side terminal 23 is formed as a contact-side terminal connection 23a, which is parallel to the contact-side terminal connection 22a and is arranged in a manner similar to that of the contact-side terminal connection 22a. A protrusion 23b (FIG. 3), which is similar to the protrusion 22b, is formed in a distal tip of the contact-side terminal connection 23a.

One end of a second stationary contact side terminal 24 is exposed outward from the connector part 7e, and the other end of the second stationary contact side terminal 24 is formed as a contact-side terminal connection 24a, which is parallel to the contact-side terminal connection 22a and is arranged in a manner similar to that of the contact-side terminal connection 22a. A protrusion 24b (FIG. 3), which is similar to the protrusion 22b, is formed in a distal tip of the contact-side terminal connection 24a.

An interconnection terminal 25 is arranged in the holder base 7b. One end of the interconnection terminal 25 is connected to a second terminal connection of the breaker 27, and an intermediate portion of the interconnection terminal 25 is connected to the brush 10b. Furthermore, the other end of the interconnection terminal 25 is connected to a second terminal connection of the capacitor C (illustrated in a simplified manner in FIG. 4 and not illustrated in FIG. 9). The capacitor C, the choke coil 26 and the breaker 27 of the present embodiment are arranged on the holder base 7b and are illustrated in a simplified manner in FIG. 4 to provide clear understanding of the connections. The exposed ends of the terminals 21-24, which are exposed outward from the connector part 7e, project on the opposite side (the lower side in FIG. 4) that is opposite from the opening direction of the opening of the connector fitting portion 7h, so that the exposed ends of the terminals 21-24 form holder-side terminal connections 21t-24t.

The brush holder device 7 includes contact members 31-33. The contact members 31-33 are secured and are electrically connected to the distal tips of the contact-side terminal connections 22a-24a, i.e., the protrusions 22b-24b, respectively. Specifically, the contact members 31-33 of the present embodiment are formed into the common shape (i.e., having only a single part number). Each contact member 31-33 is made from an electrically conductive resilient (spring) metal plate and has a base end 31b-33b, an oblique portion 31c-33c and a contacting portion 31d-33d. A through hole 31a-33a (FIG. 3) is formed through the base end 31b-33b of each contact member 31-33. The oblique portion 31c-33c extends obliquely, i.e., is bent obliquely from the base end 31b-33b of the contact member 31-33. The contacting portion 31d-33d is formed in a distal end of the oblique portion 31c-33c. The protrusions 22b-24b are received through the through holes 31a-33a of the contact members 31-33 and are secured by the split bending, which is implemented by bending the two pieces of the distal tip of each protrusion 22b-24b in opposite directions against the surface of the corresponding contact member 31-33 to secure the protrusion 22b-24b relative to the contact member 31-33. In this way, the contact members 31-33 are secured to and electrically connected to the protrusions 22b-24b. The contact members 31-33 are arranged to extend in parallel to each other. In the present embodiment, the contact-side terminal connections 22a-24a and the contact members 31-33 form stationary contacts, which are arranged in parallel in a plane that is parallel to the plane of the planar segment 4b.

A seal 34 is provided in the brush holder device 7 (the brush holder resin part 7a). Specifically, the seal 34 is made of elastomer. As shown in FIG. 3, the seal 34 is arranged to generally cover the flange 7c and the extension 7d.

Figure 5:
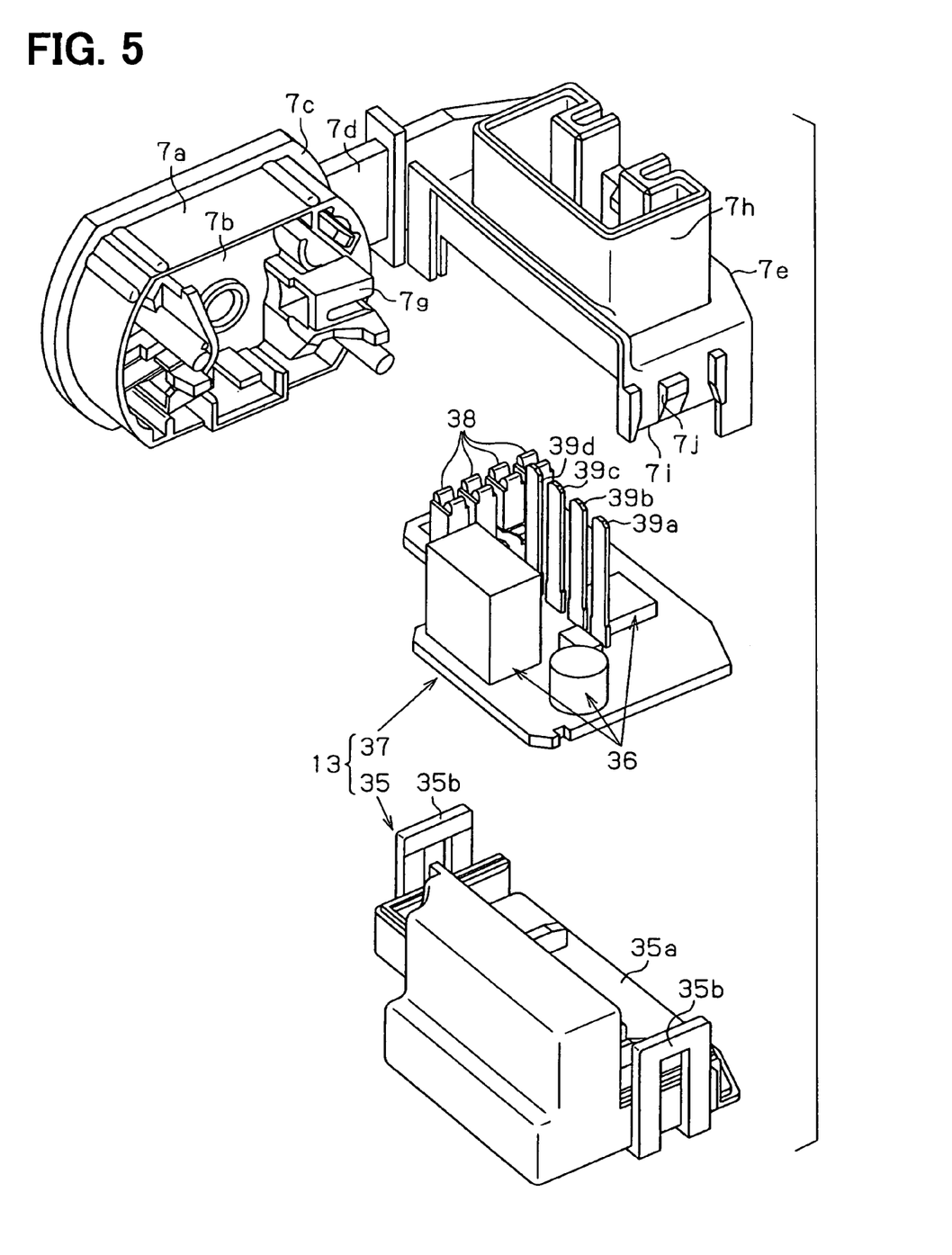
FIG. 5 is an exploded view showing a brush holder device and an intermittent drive unit of the embodiment.
Figure 6:
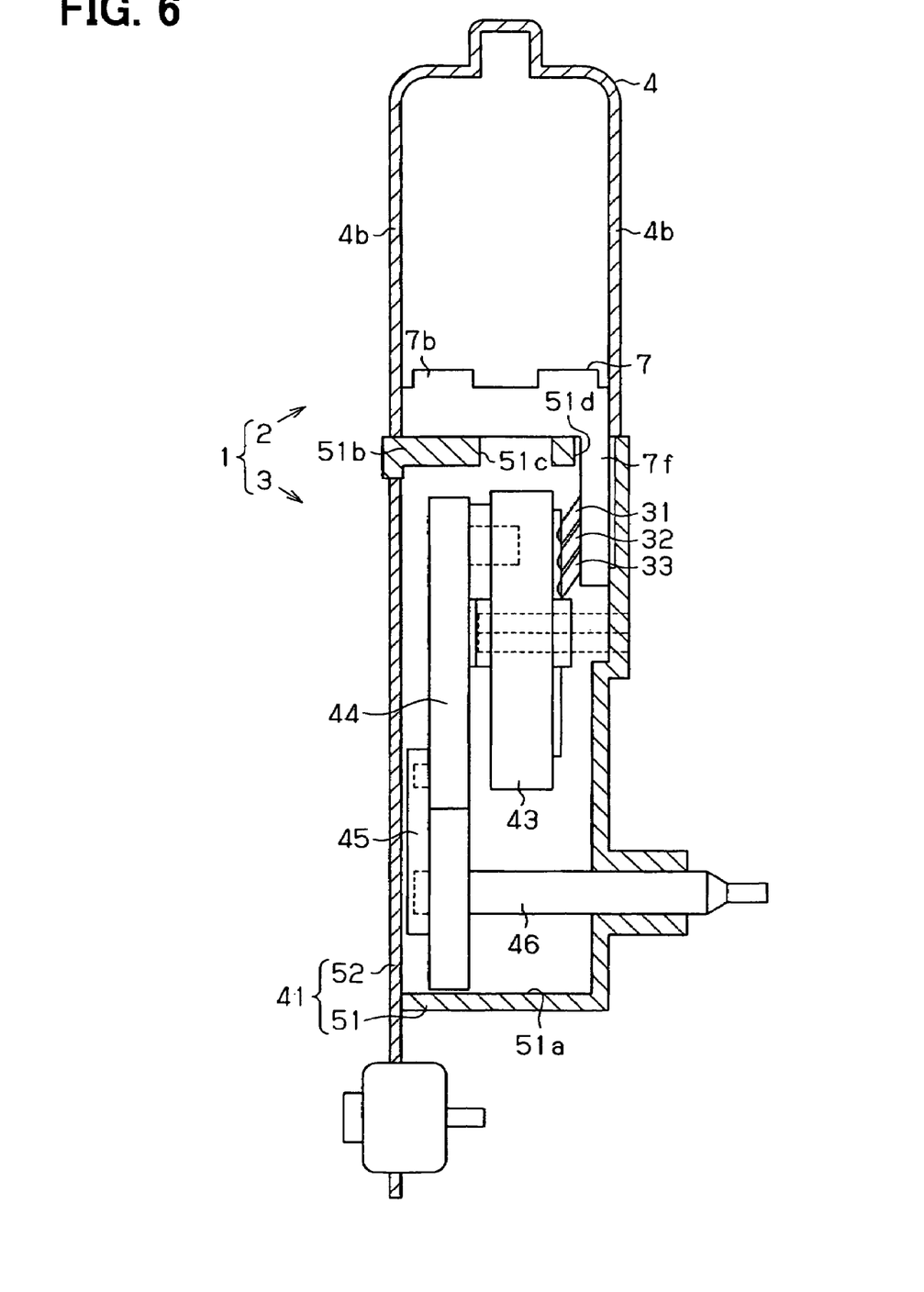
FIG. 6 is a schematic view of the motor of the embodiment.
Figure 9:
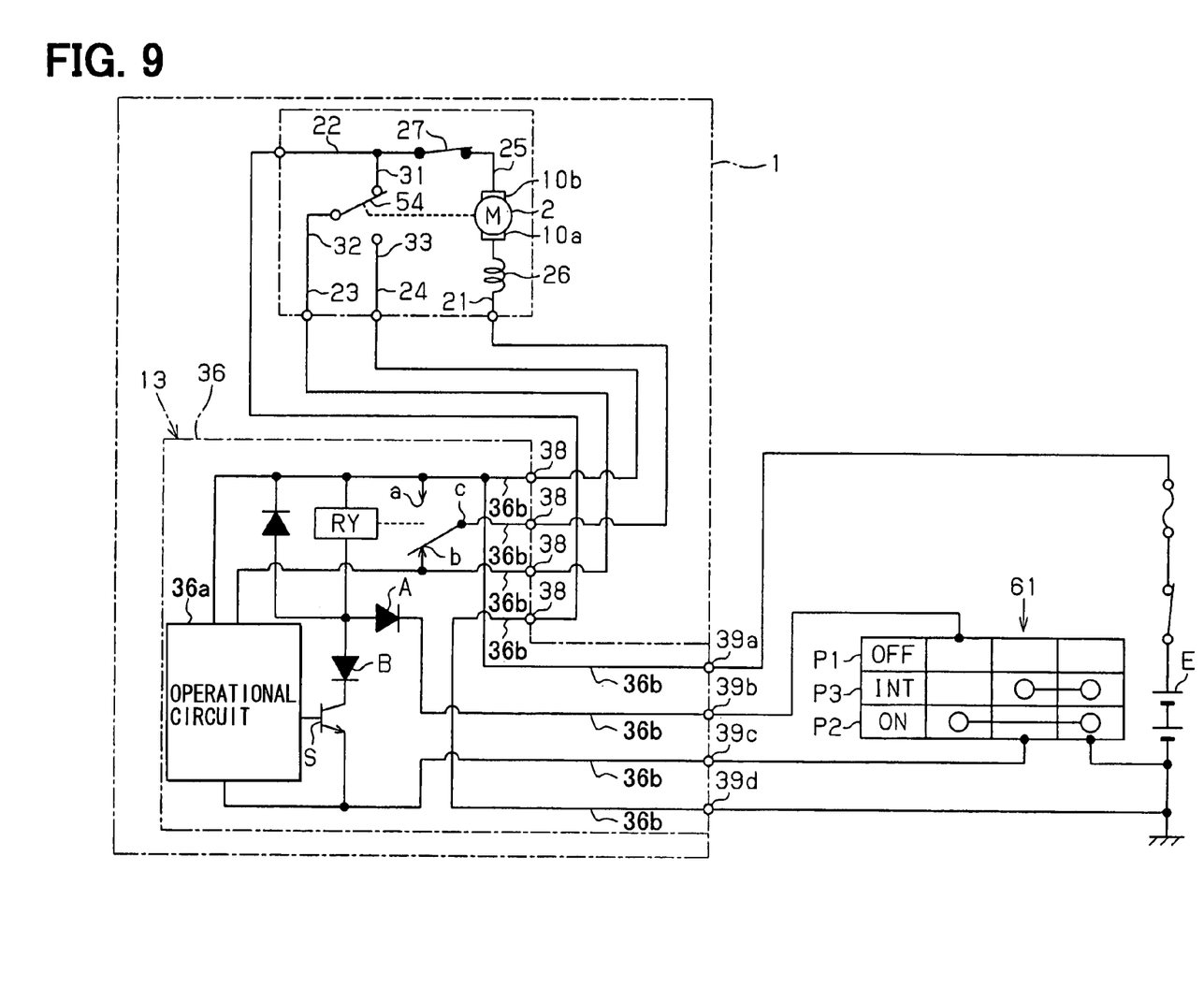
FIG. 9 is a circuit diagram showing an electrical structure of the present embodiment.

The intermittent drive unit 13 is installed to the thus constructed brush holder device 7. As shown in FIG. 5, the intermittent drive unit 13 includes an intermittent drive unit cover 35 and a circuit board 37. The circuit board 37 is provided with an intermittent drive circuit 36, which intermittently drives the wiper W. As shown in FIG. 9, the intermittent drive circuit 36 includes various circuit components, such as the diodes, transistors, to supply the drive current (electric power) to the motor main body 2 based on an electric signal supplied through the external connector 12.

The intermittent drive unit cover 35 is made of resin and is configured to be installable to the installing portion 7i of the connector part 7e. Specifically, the intermittent drive unit cover 35 includes a plate portion 35a and female engaging portions 35b. The plate portion 35a generally covers the opposite side (the lower side in FIG. 4) of the connector part 7e, which is opposite from the opening direction of the connector fitting portion 7h. The female engaging portions 35b are engaged (snap-fitted) with the engaging claws 7j. The circuit board 37 is positioned on the plate portion 35a of the intermittent drive unit cover 35. When the intermittent drive unit cover 35 is installed to the installing portion 7i of the connector part 7e, the circuit board 37 is received and is held in the interior of the installing portion 7i of the connector part 7e. The intermittent drive unit 13 (the intermittent drive unit cover 35) is detachably connected, i.e., installed to the connector part 7e (the brush holder device 7) when the female engaging portions 35b are engaged with the engaging claws 7j of the connector part 7e.

A plurality of intermittent drive circuit connections (four intermittent drive circuit connections in this embodiment) 38 is provided in the circuit board 37. The intermittent drive circuit connections 38 are electrically connected to the holder-side terminal connections 21t-24t when the intermittent drive unit 13 (the intermittent drive unit cover 35) is installed to the connector part 7e (the installing portion 7i). The intermittent drive circuit connections 38 protrude from the circuit board 37 in a direction (the upward direction in FIG. 4), which is perpendicular to a plane of the circuit board 37 and coincides with the installation direction (the direction generally parallel to a rotational axis of an output shaft 46 described below) of the intermittent drive unit 13 relative to the connector part 7e (the installing portion 7i). The intermittent drive circuit connections 38 are formed as female connections, which correspond to the holder-side terminal connections 21*t*-24*t*, which are male connections. Thus, the intermittent drive circuit connections 38 can be electrically connected to the holder-side terminal connections 21*t*-24*t* in a relatively easy and effective manner.

The circuit board 37 includes a plurality of connector-side connections (four connector-side connections in this embodiment) 39*a*-39*d*. The connector-side connections 39*a*-39*d* are directly connected to the external-side connections 12*a* (female connections) of the external connector 12 when the external connector 12 is connected to the installing portion 7*i* of the connector part 7*e*. The connector-side connections 39*a*-39*d* protrude from the circuit board 37 in the direction (the upward direction in FIG. 4), which is perpendicular to the plane of the circuit board 37 and coincides with the installation direction of the intermittent drive unit 13 relative to the connector part 7*e* (the installing portion 7*i*). Distal ends of the connector-side connections 39*a*-39*d* are received in the connector fitting portion 7*h* when the intermittent drive unit 13 (intermittent drive unit cover 35) is connected to the connector part 7*e* (the installing portion 7*i*).

With reference to FIGS. 1 and 2, the gear section 3 includes the gear housing 41, a worm shaft 42, a worm wheel 43 (serving as a wheel gear), a sector gear 44, a space retaining plate 45 and the output shaft 46. In the present embodiment, the worm shaft 42 and the worm wheel 43 form a speed reducing mechanism, which decelerates and transmits rotation of the armature 6. Also, in the present embodiment, the sector gear 44 and the space retaining plate 45 constitute a reciprocal swing mechanism, which converts rotational movement of the worm wheel 43 into reciprocal pivotal movement of the output shaft 46.

The gear housing 41 includes a housing main body 51 and a cover 52 (only a portion of the cover 52 is depicted in FIG. 2). The housing main body 51 includes a receiving recess 51*a*. An opening of the receiving recess 51*a* is opened in the direction perpendicular to the axis of the armature 6 on the side, which is closer to the other one of the planar segments 4*b* and is on the front side of the plane of FIG. 2. The cover 52 is secured in such a manner that cover 52 covers the receiving recess 51*a*.

The housing main body 51 is a die-cast product made of an aluminum alloy, which is an electrically conductive material. A yoke 4 side end of the housing main body 51, which forms a part of an outer wall of the receiving recess 51*a*, is formed as a fixing portion 51*b*, which has the corresponding shape that corresponds to the shape of the opening (the flange 4*c*) of the yoke 4. The housing main body 51 is secured to the yoke 4 by securing the fixing portion 51*b* to the flange 4*c* with screws in such a manner that the flange 7*c* of the brush holder device 7 is clamped through the seal 34 between the fixing portion 51*b* and the flange 4*c* of the yoke 4. That is, when the yoke 4 and the gear housing 41 are securely connected together, the brush holder device 7 is interposed therebetween. A center hole 51*c* (FIG. 6) is formed in the fixing portion 51*b* of the housing main body 51 at a location that corresponds to the rotatable shaft 9. The center hole 51*c* communicates between the interior of the receiving recess 51*a* and the yoke 4. Furthermore, a communication hole 51*d* (FIG. 6) is formed in the fixing portion 51*b* of the housing main body 51 at a location that corresponds to the contact base 7*f*. The communication hole 51*d* communicates between the interior of the receiving recess 51*a* and the yoke 4. That is, when the yoke 4, the brush holder device 7 and the housing main body 51 (the gear housing 41) are assembled together, the distal end of the rotatable shaft 9 extends through the center hole 51*c* into the interior of the receiving recess 51*a* (the interior of the gear housing 41), and the contact base 7*f* (the stationary contacts) extend through the communication hole 51*d* into the interior of the receiving recess 51*a* (the interior of the gear housing 41).

As discussed above, the opening of the receiving recess 51*a* is opened on the side, which is closer to the other one of the planar segments 4*b* and is on the front side of the plane of FIG. 2. Furthermore, the contact base 7*f* (the stationary contacts) is located on the side, which is closer to the one of the planar segments 4*b* and is on a back side of the plane of FIG. 2. Thus, the contact base 7*f* (the stationary contacts) is placed closer to a base (a bottom) of the receiving recess 51*a* in comparison to the worm wheel 43.

The receiving recess 51*a* includes a worm receiving portion 51*e*, a wheel receiving portion 51*f* and an output shaft receiving portion 51*g*, which are internally communicated with each other.

The worm receiving portion 51*e* is constructed to receive the worm shaft 42, which is located along an imaginary extension line that extends linearly along the rotational axis Y of the rotatable shaft 9. The worm shaft 42 is rotatably received and supported in the interior of the worm receiving portion 51*e*. The worm shaft 42 is coupled to the rotatable shaft 9 through a joint 53, which enables integral rotation of the worm shaft 42 with the rotatable shaft 9.

Figure 7:
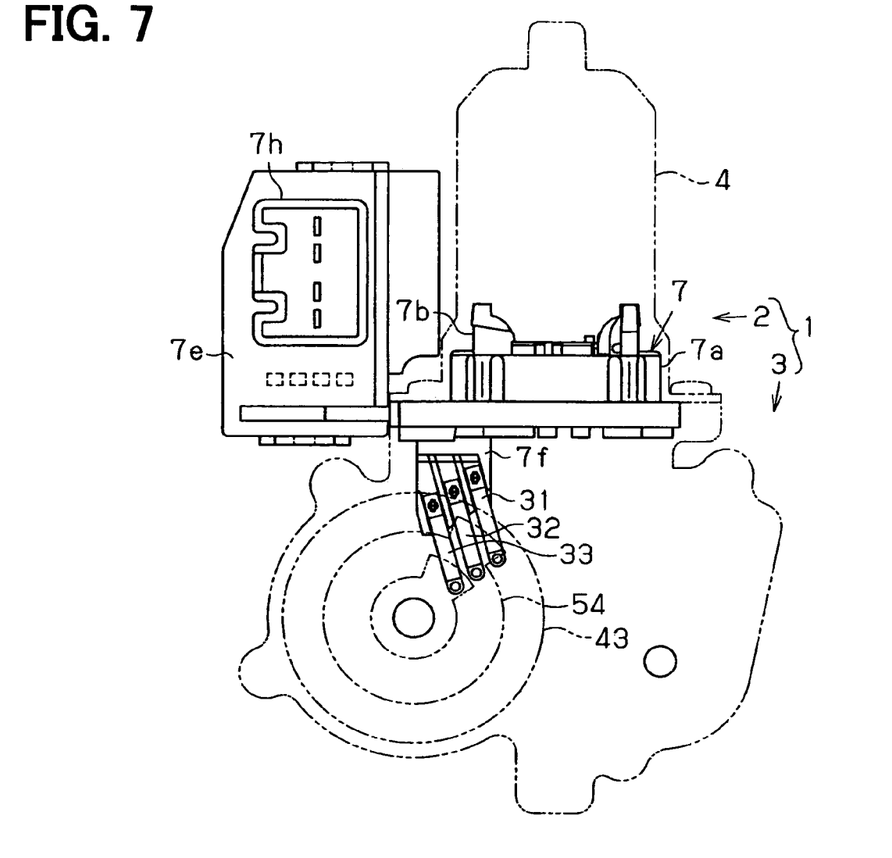
FIG. 7 is a descriptive view for describing a movable plate of the embodiment.

The wheel receiving portion 51*f* is formed on one side (the left side in FIG. 2) of the worm receiving portion 51*e* where the connector part 7*e* is located. The worm wheel 43 is rotatably supported in the interior of the wheel receiving portion 51*f*. A portion of the worm wheel 43 is meshed with the worm shaft 42. A rotational axis of the worm wheel 43 is parallel to the direction that is perpendicular to the plane of the planar segment 4*b*. As shown in FIG. 7, a movable plate 54, which has an electrically conductive pattern, is provided on one end surface of the worm wheel 43 (the surface located on the side where the bottom of the receiving recess 51*a* exists). In FIG. 7, the electrically conductive pattern of the movable plate 54 is radially defined between two dot-dot-dash lines, which are located radially inward of an outer peripheral edge of the worm wheel 43. The contacting portions 31*d*-33*d* of the contact members 31-33 are urged against the movable plate 54 (specifically, the one end surface of the worm wheel 43, which includes the movable plate 54) in a slidable manner due to the resiliency of the contact members 31-33. The conductive pattern, which is known in the technical field of the preset art, is constructed to enable electrical connection/disconnection of the contacting portions 31*d*-33*d* of the contact members 31-33 relative to the conductive pattern of the movable plate 54 in response to the rotation (a rotational angle) of the worm wheel 43.

The output shaft receiving portion 51*g* is formed on the other side of the worm receiving portion 51*e* where the connector part 7*e* is not located, i.e., on the side opposite from the wheel receiving portion 51*f*. A cylindrical output shaft support 51*h* (FIG. 1) extends outward at the center of the output shaft receiving portion 51*g*. The base end of the output shaft 46 is arranged in the interior of the output shaft receiving portion 51*g*, and the output shaft 46 is rotatably supported by the output shaft support 51*h* in such a manner that a distal end of the output shaft 46 protrudes outward from the output shaft support 51*h*.

The worm wheel 43 and the output shaft 46 are interconnected by the sector gear 44 and the space retaining plate 45 in a manner that allows transmission of the drive force between the worm wheel 43 and the output shaft 46. Specifically, the sector gear 44 is made of a metal plate. A base end of the sector gear 44 is rotatably connected to the worm wheel 43 at a location that is displaced from the center of the worm wheel 43. Furthermore, a geared portion 44a is formed in a distal end of the sector gear 44 and is meshed with a geared portion 46a that is formed in the base end of the output shaft 46. The sector gear 44 is arranged on the side (the front side of the plane of FIG. 2) of the worm wheel 43 that is closer to the opening of the receiving recess 51a. The space retaining plate 45 is made of a metal plate. One end of the space retaining plate 45 is rotatably connected to a gear center of the geared portion 44a of the sector gear 44. The other end of the space retaining plate 45 is rotatably connected to the base end of the output shaft 46. Specifically, the space retaining plate 45 maintains the inter-axial space (distance) between the gear center of the geared portion 44a and the output shaft 46. The space retaining plate 45 is arranged on the side (the front side of the plane of FIG. 2) of the sector gear 44 that is closer to the opening of the receiving recess 51a. Thus, when the worm wheel 43 is rotated, the output shaft 46 is reciprocally pivoted (reciprocally rotated) through the action of the sector gear 44 (and the action of the space retaining plate 45).

Figure 8A:
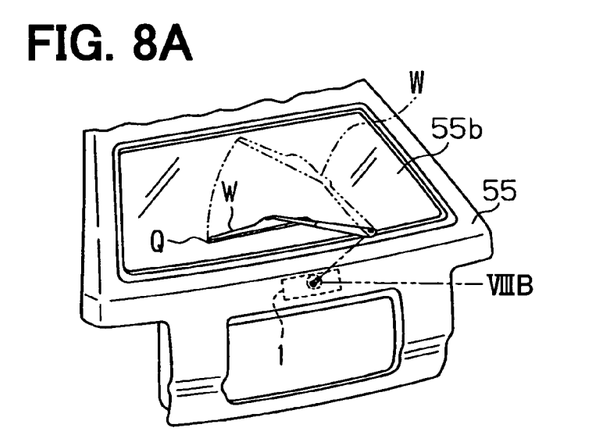
FIG. 8A is a schematic perspective partial view of a vehicle body according to the embodiment.
Figure 8B:
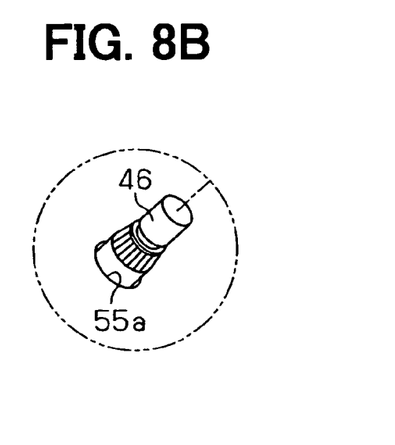
FIG. 8B is an enlarged view of a circled portion VIIIB in FIG. 8A.

As shown in FIGS. 8A and 8B, the motor 1 is generally entirely received in an interior of a vehicle body (a rear hatch door) 55, and only the distal end of the output shaft 46 protrudes outward of the vehicle body 55 through an installation opening 55a, which is formed in the vehicle body 55. The wiper (the rear wiper) W for wiping a rear window glass (a wiping surface) 55b is directly connected to the distal end of the output shaft 46, which protrudes outward from the vehicle body 55. Thus, when the output shaft 46 is reciprocally pivoted, the wiper W is reciprocally swung to wipe the rear window glass 55b.

Next, in view of FIG. 9, there will be described an electrical construction of the motor 1 upon installation of the motor 1 to the vehicle body 55 and the installation of the vehicle body 55 side external connector 12 to the connector part 7e (the connector fitting portion 7h). Here, it should be noted that the circuit board 37 has circuit board-side conductive lines 36b, which electrically connect between the intermittent drive circuit connections 38 and the connector-side connections 39a-39d.

The connector-side connection 39a is connected to the power source (the high electric potential side power source) E through a fuse and an ignition switch. The connector-side connections 39b, 39c are connected to a selecting switch 61, which is arranged at a vehicle driver seat. The connector-side connection 39d is connected to the ground.

The selecting switch 61 includes a stop position P1 (OFF), a normal operational position P2 (ON) and an intermittent operational position P3 (INT). The stop position P1 (OFF) is for stopping the motor 1. The normal operational position P2 (ON) is for continuously driving the motor 1. The intermittent operational position P3 (INT) is for intermittently driving the motor 1 with predetermined stop intervals. The stop intervals may be variably set, if desired. In the stop position P1, the selecting switch 61 does not connect any of the connector-side connections 39b, 39c to the ground (making an electrically floating state). In the normal operational position P2, the selecting switch 61 connects the connector-side connection 39b to the ground. In the intermittent operational position P3, the selecting switch 61 connects the connector-side connection 39c to the ground.

In the motor 1, when the selecting switch 61 is shifted to the normal operational position P2, the power source (the high electric potential side power source) E is connected to the ground through the connector-side connection 39a, the relay coil RY, the diode A and the selecting switch 61. Thus, the connection of the relay contact c is shifted from the relay contact b to the relay contact a, and the power source E is connected to the brush 10a from the connector-side connection 39a through the relay contact a, the relay contact c and the choke coil 26. Therefore, the electric power is supplied to the motor 1 to continuously drive the motor 1 regardless of the contact state between the movable plate 54 and the contact members 31-33. That is, the output shaft 46 (the wiper W) is reciprocally swung to continuously wipe the window glass with the wiper W.

When the selecting switch 61 is shifted to the intermittent operational position P3, a switching element S is turned on for a predetermined short time period by an operational signal received from an intermittent operational circuit 36a of the intermittent drive circuit 36. Thus, during this short time period, the power source (the high electric potential side power source) E is connected to the ground through the connector-side connection 39a, the relay coil RY, the diode B and the selecting switch 61. Thus, the connection of the relay contact c is temporarily shifted from the relay contact b to the relay contact a, and the power source E is connected to the brush 10a from the connector-side connection 39a through the relay contact a, the relay contact c and the choke coil 26 regardless of the contact state between the movable plate 54 and the contact members 31-33. As a result, the motor 1 is rotated for the predetermined short time period. Due to the rotation of the motor 1 for the above-predetermined short time period, the movable plate 54 keeps the contact state between the contact member 32 and the contact member 33. Furthermore, after elapse of the predetermined short time period, the switching element S is turned off. Thus, the relay coil RY is de-energized, and the connection of the relay contact c is shifted from the relay contact a to the relay contact b. As a result, the power source E, which has been connected to the brush 10a regardless of the contact state between the movable plate 54 and the contact members 31-33, is now connected to the brush 10a through the contact member 33, the movable plate 54, the contact member 32, the relay contact b, the relay contact c and the choke coil 26. That is, the electric power is supplied from the power source E based on the contact state between the movable plate 54 and the contact members 31-33. When the movable plate 54 reaches a predetermined angular position (the position where the conductive pattern of the movable plate 54 connects between the contact member 31 and the contact member 32) that corresponds to a predetermined stop position Q (FIG. 8A) of the wiper W, the power supply of the power source E, which has been kept supplied according to the contact state between the movable plate 54 and the contact members 31-33, is turned off. Thus, the motor 1 is stopped, and the wiper W is stopped at the predetermined position. While the selecting switch 61 is positioned in the intermittent operational position P3, the operational signal of the intermittent operational circuit 36a of the intermittent drive circuit 36 is outputted to the switching element S at the predetermined stop time intervals to intermittently repeat the above operation. Therefore, the motor 1 is intermittently operated. That is, the output shaft 46 (the wiper W) is intermittently, reciprocally pivoted to intermittently wipe the window glass with the wiper W.

At the time of shifting the selecting switch 61 from the normal operational position P2 or the intermittent operational position P3 to the stop position P1, when the movable plate 54 is located in the predetermined angular position (the position where the conductive pattern of the movable plate 54 connects between the contact member 31 and the contact member 32), the power supply of the power source E is immediately turned off, and the brush 10a is connected to the ground through the contact members 31, 32 (see FIG. 9). Thus, the motor 1 is stopped. At this time, when the movable plate 54 is not located in the predetermined angular position and is thus located in the position where the conductive pattern of the movable plate 54 connects between the contact member 32 and the contact member 33, the relay coil RY is de-energized, so that the connection of the relay contact c is shifted from the relay contact a to the relay contact b. Thus, the power source E is connected to the brush 10a through the contact member 33, the movable plate 54, the contact member 32, the relay contact b, the relay contact c and the choke coil 26. That is, the electric power is supplied from the power source E based on the contact state between the movable plate 54 and the contact members 31-33. When the movable plate 54 rotates together with the worm wheel 43 and thereby reaches the predetermined angular position (the position where the conductive pattern of the movable plate 54 connects between the contact member 31 and the contact member 32) that corresponds to the stop position Q of the wiper W, the power supply of the power source E, which has been kept supplied according to the contact state between the movable plate 54 and the contact members 31-33, is turned off. Thus, the motor 1 is stopped, and the wiper W is stopped at the predetermined position Q. That is, when the selecting switch 61 is shifted to the stop position P1, the power supply to the motor 1 is maintained until the movable plate 54 reaches the predetermined angular position corresponding to the predetermined stop position Q of the wiper W and is then automatically turned off at the predetermined angular position.

When the movable plate 54 (the worm wheel 43) is located in the predetermined angular position (the position shown in FIG. 9), the wiper W is positioned in the predetermined stop position Q, which is located in, for example, the lower end of the rear window glass 55b. Thus, when the selecting switch 61 is shifted from the normal operational position P2 or the intermittent operational position P3 to the stop position P1, the wiper W is automatically stopped at the predetermined stop position Q. In FIG. 8A, the wiper W at the predetermined stop position Q is indicated by a solid line. The wiper W is swung along a wiping path (indicated by a dot-dash line in FIG. 8A) on the rear window glass 55b. The wiper W, which is indicated by a dot-dot-dash line in FIG. 8A, is located at a turning point in the wiping path on the window glass 55b.

Next, advantages of the present embodiment will be described.

(1) The connector part 7e, the contact members 31-33 (the stationary contacts) and the brushes 10a, 10b are electrically connected by the terminals 21-25 of the brush holder device 7, and the intermittent drive unit 13, which is installed to the brush holder device 7, is electrically connected to the terminals 21-25. That is, the above multiple components, each of which requires its electrical connection, are connected through the terminals 21-25 integrated in the brush holder device 7. In this way, in comparison to the previously proposed technique, which requires the installation of the separate connection unit, the number of required components, and the number of required assembling steps can be reduced.

Furthermore, the intermittent drive unit 13 is installed to the brush holder device 7, which is spaced from the output shaft 46 (with respect to the gear housing 41). Thus, even when the water (e.g., rain water droplets or car wash water) intrudes into an interior of the vehicle body 55 along the output shaft 46, the intruded water is less likely applied to the intermittent drive unit 13. Furthermore, the above multiple components, each of which requires its electrical connection, are connected through the terminals 21-25 integrated in the brush holder device 7. Thus, the water protective measure for the multiple components can be made integrally without a need for separately protecting each individual component.

Because of the above reasons, the water resistance of the respective conductive lines can be effectively improved with the simple structure.

(2) The intermittent drive unit 13 is detachably installed to the connector part 7e (the installing portion 7i). Thus, for example, the intermittent drive circuit 36 can be easily changed to another one that is designed based on a different design specification. Furthermore, for example, a maintenance work, such as a repairing work of a malfunction of the intermittent drive circuit 36, can be eased.

(3) In the installed state of the intermittent drive unit 13 to the connector part 7e (the installing portion 7i), the intermittent drive circuit connections 38 are electrically connected to the holder-side terminal connections 21t-24t of the terminals 21-24 (resulting in elimination of the need for the separate connecting step for making electrical connection therebetween performed separately from the installation step). Thus, the manufacturing (the assembling) is eased.

(4) The intermittent drive unit 13 includes the connector-side connections 39a-39d, which are directly connected to the external-side connections 12a of the external connector 12. Thus, the structure for connecting the external connector 12 (the external-side connections 12a) to the terminals 21-25 through the intermittent drive circuit 36 can be simplified. Specifically, in the case where the connector-side connections are previously provided in the connector part, the structure (electrical connections) for electrically connecting between the connector-side connections and the intermittent drive circuit is required. This may result in diminished reliability of the electrical connections and an increase in the number of components. In comparison to this, in the above-described structure of the present embodiment, the intermittent drive circuit 36 includes the connector-side connections 39a-39d, which are directly connected to the external-side connections 12a of the external connector 12. Thus, the number of electrical connections is reduced. Therefore, the reliability of the electrical connections can be improved, and the number of required components can be reduced.

(5) The connector-side connections 39a-39d, which are directly connected to the external-side connections 12a of the external connector 12, are all provided in the intermittent drive unit 13. Thus, the shape and/or the structure of each of the holder-side terminal connections 21t-24t, the intermittent drive circuit connections 38 and/or the connector-side connections 39a-39d can be unified to allow, for example, easy manufacturing of these components. For example, the terminal 22 of the second power source (the low electric potential power source) may be directly connected to the ground (FIG. 9). Thus, the holder-side terminal connection 22t may be extended and bent to form a connector-side connection, which is directly connected to the external-side connection 12a. When such a modification is made, the terminal 22 has a different shape, which is different from other terminals 21, 23, 24 of the intermittent drive unit 13, and the relative position of the connector-side connection of the terminal 22 is likely deviated from the other connector-side connections of the intermittent drive unit 13. However, the above-described structure of the present embodiment can avoid such a trouble. Furthermore, each of the corresponding electrical connections is uniformly shaped, so that the same component (the component having the same part number) can be used to minimize an increase in the component costs.

(6) The intermittent drive circuit connections 38 protrude from the circuit board 37 in the installation direction (the upward direction in FIG. 4) of the intermittent drive unit 13 relative to the connector part 7e (the installing portion 7i). Thus, when the intermittent drive unit 13 is installed to the connector part 7e, the intermittent drive circuit connections 38 are easily connected to the holder-side terminal connections 21t-24t.

(7) The connector-side connections 39a-39d protrude from the circuit board 37 in the installation direction (the upward direction in FIG. 4) of the intermittent drive unit 13 relative to the connector part 7e (the installing portion 7i). Thus, when the intermittent drive unit 13 is installed to the connector part 7e, the connector-side connections 39a-39d are easily guided into the connector fitting portion 7h of the connector part 7e.

(8) The terminals 21-25, which are made of the planar conductive members (the electrically conductive metal plates), are embedded in the dielectric resin material (the brush holder resin part 7a), which constitutes the housing of the brush holder device 7. With this construction, the multiple components, each of which requires its electrical connection, are provided in the brush holder device 7. Thus, the terminals 21-25 are arranged close to one another and therefore can be easily arranged. Furthermore, the electric insulation between the terminals 21-25 can be easily and effectively achieved.

The above embodiment can be modified as follows.

In the above embodiment, the intermittent drive unit 13 is detachably installed to the connector part 7e (the installing portion 7i) in a relatively easy manner because of the female engaging portions 35b and the engaging claws 7j of the connector part 7e. However, the present invention is not limited to this arrangement. For example, the intermittent drive unit 13 may be non-detachably secured to the connector part 7e by, for example, a bonding material to limit detachment of the intermittent drive unit 13 from the connector part 7e. Furthermore, the above detachable installation may be implemented through use of any other structural component(s), such as screws, other than the female engaging portions 35b and the engaging claws 7j.

In the above embodiment, in the installed state of the intermittent drive unit 13 to the connector part 7e (the installing portion 7i), the intermittent drive circuit connections 38 are electrically connected to the holder-side terminal connections 21t-24t without requiring any separate connecting step. Alternatively, a separate connecting step for connecting the intermittent drive circuit connections 38 to the holder-side terminal connections 21t-24t may be provided besides the installing step for installing the intermittent drive unit 13 to the connector part 7e (the installing portion 7i).

In the above embodiment, the intermittent drive unit 13 includes the connector-side connections 39a-39d, which are directly connected to the external-side connections 12a. However, the present invention is not limited to this. For example, connector-side connections, which are directly connected to the external-side connections 12a, may be provided in the connector part, and these connector-side connections may be electrically connected to the intermittent drive circuit.

In the above embodiment, the connector-side connections 39a-39d, which are directly connected to the external-side connections 12a, are all provided in the intermittent drive unit 13. However, the present invention is not limited to this. For example, the holder-side terminal connection 22t of the terminal 22 for the second power source (the low electric potential power source) may be further extended and bent to form a connector-side connection, which is directly connected to the corresponding external-side connection 12a.

In the above embodiment, the intermittent drive circuit connections 38 protrude from the circuit board 37 in the installation direction of the intermittent drive unit 13 to the connector part 7e. However, the present invention is not limited to this. For example, the intermittent drive unit 13 may be modified such that the circuit board 37 is eliminated from the intermittent drive unit 13, and the intermittent drive circuit is directly secured to the intermittent drive unit cover, so that the intermittent drive circuit connections are directly secured to the intermittent drive unit cover.

In the above embodiment, the connector-side connections 39a-39d protrude from the circuit board 37 in the installation direction of the intermittent drive unit 13 to the connector part 7e. However, the present invention is not limited to this. For example, the intermittent drive unit 13 may be modified such that the circuit board 37 is eliminated from the intermittent drive unit 13, and the intermittent drive circuit is directly secured to the intermittent drive unit cover, so that the connector-side connections are directly secured to the intermittent drive unit cover.

In the above embodiment, the terminals 21-25 are made of the planar conductive members (the electrically conductive metal plates) and are embedded in the dielectric resin material (the brush holder resin part 7a), which constitutes the housing of the brush holder device 7. However, the present invention is not limited to this, and any other suitable structure may be alternatively provided. For example, the holder-side conductive lines (the terminals 21-25 made of the planar conductive members, respectively) may be secured and externally, entirely exposed on the dielectric resin material (the brush holder resin part 7a) instead of embedding the holder-side conductive lines in the dielectric resin material (the brush holder resin part 7a).

In the above embodiment, the housing main body 51 is made of the aluminum alloy. However, the present invention is not limited to this. For example, the housing main body 51 may be made of any other suitable metal material other than the aluminum alloy or made of any suitable resin material.

A washer-linked mode (a washer-linked operational position) for supplying washer fluid by synchronously driving a washer motor may be provided in the selecting switch 61 of the above embodiment arranged at the vehicle driver seat in a manner similar to that of any of the previously proposed washer linked drive circuit for synchronously driving the washer motor.

In the above embodiment, the present invention is implemented in the vehicle rear wiper system (the wiper motor 1). However, the present invention is not limited to this. For example, the present invention may be alternatively or additionally implemented in a vehicle front wiper system (a wiper motor). In such a case, for example, the sector gear 44 and the space retaining plate 45 may be eliminated from the motor 1, and the output shaft of the motor 1 may be rotated integrally with the worm wheel 43 and may be linked to front wipers through a link mechanism. Furthermore, in the above embodiment, the yoke 4 is formed as the generally flat form. However, the present invention is not limited to this and can be modified to any other form, such as a circular form having a circular cross section.

In the above embodiment, the armature is rotated continuously in the single direction, and this rotational movement of the armature is converted into the reciprocal pivotal movement of the output shaft. Alternatively, the armature may be rotated forward and backward to reciprocally swing the wiper through use of a known control circuit.

Additional advantages and modifications will readily occur to those skilled in the art. The invention in its broader terms is therefore not limited to the specific details, representative apparatus, and illustrative examples shown and described.

What is claimed is:

1. A wiper motor for driving a wiper, the wiper motor comprising:

a yoke housing;

an armature that is rotatably received in the yoke housing;

a gear housing that is connected to the yoke housing;

a wheel gear that is rotatably received in the gear housing and decelerates rotation of the armature, wherein the wheel gear has a movable plate, which is secured to an end surface of the wheel gear and has an electrically conductive pattern;

an output shaft that is rotatably supported and is driven by a drive force transmitted from the wheel gear, wherein the output shaft is directly or indirectly connected to the wiper;

a brush holder device that is installed between the yoke housing and the gear housing, wherein the brush holder device includes:

a plurality of brushes that supply electric power to the armature;

a holder base that has a brush holder, which holds the plurality of brushes;

a connector part that extends outward of the yoke housing from the holder base and is connectable with an external connector to receive an electric signal from the external connector;

a contact base that extends from the holder base into an interior of the gear housing through a communication hole, which is formed in a yoke housing side end of the gear housing, wherein the contact base supports a plurality of stationary contacts that are slidably engageable with the electrically conductive pattern of the movable plate, wherein the plurality of stationary contacts is electrically connected and disconnected to the electrically conductive pattern of the movable plate in response to rotation of the wheel gear to stop the wiper at a predetermined position; and a plurality of holder-side conductive lines, wherein at least two of the plurality of holder-side conductive lines provide an electrical connection between the plurality of stationary contacts and the plurality of brushes; and an intermittent drive unit that is installed to the brush holder device, wherein the intermittent drive unit includes an intermittent drive circuit that is electrically connected to the plurality of holder-side conductive lines upon installation of the intermittent drive unit to the brush holder device to intermittently drive the armature through the plurality of brushes based on the electric signal received from the external connector.

2. The wiper motor according to claim 1, wherein the intermittent drive unit is detachably installed to the brush holder device.

3. The wiper motor according to claim 1, wherein the intermittent drive unit is non-detachably secured to the brush holder device.

4. The wiper motor according to claim 2, wherein:

the intermittent drive unit is detachably installed to the connector part of the brush holder device;

each of the at least two of the plurality of holder-side conductive lines includes a holder-side terminal connection; and the intermittent drive circuit includes a plurality of intermittent drive circuit connections, which are electrically connected to the holder-side terminal connections of the at least two of the plurality of holder-side conductive lines upon installation of the intermittent drive unit to the connector part of the brush holder device.

5. The wiper motor according to claim 2, wherein the intermittent drive unit includes at least one connector-side connection, which protrudes from the connector part and is directly connected to at least one external-side connection of the external connector.

6. The wiper motor according to claim 5, wherein the intermittent drive unit includes a circuit board that has:

the intermittent drive circuit;

the plurality of intermittent drive circuit connections;

the at least one connector-side connection; and a plurality of circuit board-side conductive lines that electrically connect between the plurality of intermittent drive circuit connections and the at least one connector-side connection.

7. The wiper motor according to claim 4, wherein the plurality of intermittent drive circuit connections and the at least one connector-side connection of the intermittent drive unit protrude in an installation direction of the intermittent drive unit relative to the connector part.

8. The wiper motor according to claim 1, wherein:

at least a portion of the brush holder device is made of a dielectric resin material;

each of the at least two of the plurality of holder-side conductive lines is made as a planar conductive member; and a portion of each of the at least two of the plurality of holder-side conductive lines is embedded in the dielectric resin material of the brush holder device.

9. The wiper motor according to claim 1, further comprising a reciprocal swing mechanism that is arranged in the gear housing and converts rotational movement of the wheel gear into reciprocal pivotal movement of the output shaft, wherein the wiper is directly secured to the output shaft.

10. The wiper motor according to claim 1, wherein:

the output shaft is located on one side of a rotational axis of the armature; and the connector part is located on the other side of the rotational axis of the armature.

11. The wiper motor according to claim 10, wherein the gear wheel is located on the other side of the rotational axis of the armature.

12. The wiper motor according to claim 1, wherein the intermittent drive unit is installed to the brush holder device in a direction generally parallel to a rotational axis of the output shaft.

* * * * *